United States Patent
Wredenhagen

(10) Patent No.: US 9,300,966 B2
(45) Date of Patent: Mar. 29, 2016

(54) ADAPTIVE FREQUENCY DOMAIN FILTERING FOR PHASE PLANE CORRELATION

(75) Inventor: Gordon F. Wredenhagen, Toronto (CA)

(73) Assignee: ATI Technologies ULC, Markham, Ontario (CA)

(*) Notice: Subject to any disclaimer, the term of this patent is extended or adjusted under 35 U.S.C. 154(b) by 1549 days.

(21) Appl. No.: 12/621,924

(22) Filed: Nov. 19, 2009

(65) Prior Publication Data
US 2010/0150225 A1 Jun. 17, 2010

Related U.S. Application Data

(60) Provisional application No. 61/116,493, filed on Nov. 20, 2008.

(51) Int. Cl.
| | | |
|---|---|---|
| H04N 7/12 | (2006.01) | |
| H04N 19/117 | (2014.01) | |
| G06T 7/20 | (2006.01) | |
| H04N 19/176 | (2014.01) | |
| H04N 19/61 | (2014.01) | |
| H04N 19/14 | (2014.01) | |
| H04N 19/48 | (2014.01) | |
| H04N 19/80 | (2014.01) | |
| H04N 19/547 | (2014.01) | |

(52) U.S. Cl.
CPC ........ *H04N 19/117* (2014.11); *G06T 7/206* (2013.01); *H04N 19/14* (2014.11); *H04N 19/176* (2014.11); *H04N 19/48* (2014.11); *H04N 19/547* (2014.11); *H04N 19/61* (2014.11); *H04N 19/80* (2014.11); *G06T 2207/10016* (2013.01)

(58) Field of Classification Search
None
See application file for complete search history.

(56) References Cited

U.S. PATENT DOCUMENTS

| | | | | |
|---|---|---|---|---|
| 6,230,106 | B1 * | 5/2001 | Metzger | 702/85 |
| 6,401,057 | B1 * | 6/2002 | Kadtke et al. | 702/189 |
| 6,947,509 | B1 * | 9/2005 | Wong | 375/350 |
| 7,653,230 | B2 * | 1/2010 | Hsieh | 382/131 |
| 2004/0062420 | A1 | 4/2004 | Rohaly | |
| 2004/0179594 | A1 | 9/2004 | Biswas et al. | |
| 2005/0033505 | A1 * | 2/2005 | Zatz | 701/117 |
| 2007/0187505 | A1 * | 8/2007 | Rhoads et al. | 235/454 |
| 2009/0034875 | A1 * | 2/2009 | Park | 382/280 |

OTHER PUBLICATIONS

International Search Report from the Canadian Intellectual Property Office for International Application No. PCT/IB2009/007627, dated Mar. 30, 2010 (3 pages).
Written Opinion from the Canadian Intellectual Property Office for International Application No. PCT/IB2009/007627, dated Mar. 30, 2010 (4 pages).

* cited by examiner

*Primary Examiner* — Frederick Bailey
(74) *Attorney, Agent, or Firm* — Volpe and Koenig, P.C.

(57) ABSTRACT

In a Phase Plane Correlation (PPC) process, using adaptive frequency domain filtering to aid in generating candidate motion vectors. It is determined when it is beneficial to pre-filter an input image, prior to a PPC process. This results in more reliable and consistent PPC surfaces than otherwise. The filter is applied in the frequency domain where time-domain convolution becomes a much more efficient component-wise multiplication with an in-place window. An energy measure of the high-frequency content in the computed Fourier surfaces gauges the degree of high frequency content in the image. First, the Fourier transform of the two images is computed. Then, the high-frequency content is estimated from the Fourier surfaces. A window function is computed as a function of the high-frequency energy. The window is applied to the Fourier surfaces. Then, the modified Fourier surfaces are fed into the PPC process.

7 Claims, 7 Drawing Sheets

ADAPTIVE FREQUENCY DOMAIN FILTERING FOR PHASE PLANE CORRELATION

CROSS-REFERENCE TO RELATED APPLICATIONS

This application claims the benefit of U.S. Provisional Application No. 61/116,493 filed on Nov. 20, 2008 by WREDENHAGEN, Gordon Finn, entitled ADAPTIVE FREQUENCY DOMAIN FILTERING FOR PHASE PLANE CORRELATION, the entire contents of which is incorporated by reference, and for which priority is claimed under 35 U.S.C. §119(e).

BACKGROUND

1. Field of the Invention

The invention relates in general to correlating two images. More specifically, the invention relates to the use of phase plane correlation (PPC).

2. Related Art

In image processing applications, it is desirable to obtain clear, high resolution images and video from digital data. Motion vector data provides information related to the speed and direction of movements of critical parts of an image, e.g., portions of the image determined to be changing over a period of time such as from one frame of an image to the next. Applications making use of motion vector data include, but are not limited to, format conversion, de-interlacing, compression, image registration and others where some kind of temporal interpolation is necessary. Format conversion examples include 1) frame rate conversion, such as the conversion of NTSC video rate to HDTV video rate, 2) conversion of interlaced video to progressive video, and 3) the 3-to-2 pull-down artifact removal in conventional DVD format video. Video data compression processes also benefit from accurate motion vector data.

Compression is often used to permit the useful transmission of data through a restricted bandwidth. Popular video compression algorithms utilize video compression standards, such as, for example, MPEG2, MPEG4, H.26L, etc. Another application that benefits from accurate motion vector data analysis is the production of display special effects, such as the global estimation of camera parameters useful to produce display effects for pan, tilt or zoom.

Digital processing of television signals (e.g., encoding, transmission, storage and decoding), as a practical matter, requires the use of motion vector data. Motion vector data is needed because a television signal is not typically filtered in a manner required by the Nyquist criterion prior to sampling in the temporal domain. Thus, a moving image contains information that is temporally aliased. Conventional linear interpolation techniques accordingly are not successful in the temporal domain.

The ITU-T (International Telecommunication Union Telecommunication Standardization Sector) recommends H.261 and 11.262 standards as methods for encoding, storing, and transmitting image signals. The ISO (International Organization for Standardization) recommends MPEG-1 (11172-2) and MPEG-2 (13818-2). Methods based on these standards adopt inter frame prediction for motion compensation in encoding video signals.

Inter frame prediction is based upon the recognized redundancy characteristic of video data. Video signals contain highly redundant information from frame to frame (many image elements of a predetermined frame do not move and thus will be repeated in a subsequent frame). This holds true for frames generated as a result of special effects, for example, or frames generated to increase the definition of a video signal. Motion compensated inter frame prediction is a technique that takes advantage of inter frame redundancy to reduce the amount of data required to describe sequences of video frames or to create image frames, such as those created for example, in producing a progressive scan video signal from an interlaced video signal. An accurate determination of frame to frame motion is important to conduct such operations.

One typical method for motion detection is carried out in the image domain. This method attempts to match blocks from a reference (previous) image frame with blocks from a current (subsequent to the reference) frame. Many so-called block matching methods start by calculating the absolute values of the differences in pixels in a block of a current image frame with all of the blocks in the reference image frame. A block in the current image frame having the smallest difference is determined to match. The displacement between the block in the current frame and the corresponding matching block in the reference frame is then characterized by horizontal and vertical displacement components, thus producing a motion vector. This procedure is known as the full-search procedure.

Another method for motion detection utilizes the phase plane rather than the image plane. An example of such phase plane motion detection is described in U.S. Pat. No. 7,197,074—Biswas et al., entitled PHASE PLANE CORRELATION MOTION VECTOR DETERMINATION METHOD, the subject matter of which is incorporated herein by reference as if fully set forth. Phase plane correlation (PPC) is an efficient technique for correlating two images. In the frequency domain, motion is indicated by a phase shift (phase difference) between a particular block of a current image frame and a corresponding block of a reference image frame. A correlation surface obtained by an inverse Fourier transform of the phase difference indicates the quantity of pixels that moved and the magnitude of pixel movement. This technique has the advantage of a direct determination of the motion vectors. However, phase plane correlation motion vector determination techniques do not meet current video processing demands. There remains a need for an efficient method to calculate the motion in an image with a reduction in the chance for producing erroneous assignments of motion vectors to pixels.

Now conventional phase plane correlation (PPC) results in a correlation surface in which peaks and their respective amplitudes are a direct indication of the similarity in image luminance. There is a normalization step in the conventional PPC technique that attenuates dissimilarities in luminance resulting in a normalized correlation surface that is more discerning than simple correlation. However, the traditional PPC approach does not adequately deal with different input image content.

A standard luminance based PPC correlation surface is derived as follows:

$$PPC(I_1, I_2) = F^{-1}\left(\frac{F(I_1) \cdot F(I_2)*}{|F(I_1) \cdot F(I_2)*|}\right).$$

This equation is referred to as the "luminance based PPC". I, F and $F^{-1}$ are the image luminance, Fourier and inverse Fourier transforms, respectively.

FIG. 1 (Prior Art) is a block diagram illustrating a portion of a known arrangement for PPC image correlation. A luminance signal LUMA 1, which may represent a first image in the time domain, is transformed by a first Fast Fourier Transform FFT1 into a first frequency domain signal F1. A luminance signal LUMA 2, which may represent a second image, is transformed by a second Fast Fourier Transform FFT2 into a second frequency domain signal F2. Phase plane correlation is carried out in a defined window in a phase plane correlator 102 according to the expression $$(W \cdot F1) \cdot (W \cdot F2)^* / |(W \cdot F1) \cdot (W \cdot F2)^*|.$$

A frequency domain signal from phase plane correlator 102 is transformed back to the time domain by an Inverse Fast Fourier Transform IFFT to provide a phase plane correlated surface.

In order for PPC to work optimally, objects that undergo displacement (move from one frame to the next) need to be well defined. This means that the boundaries of such objects must be defined by sharp edges. However, when an input image is of a very high frequency, for example, close to the Nyquist frequency, it is difficult to clearly define the boundaries. It is often desirable to pre-process an input image using a low-pass filter. However, such pre-processing can be problematic. Frequency extremes of image content can not be properly processed with the same filter. Moreover, filtering in the time-domain requires performing a computationally complex two-dimensional convolution. For various applications, this is prohibitive.

SUMMARY

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention. Consistent with the principles of the present invention as embodied and broadly described herein, the present invention includes the following.

The invention is directed in general to improved Phase Plane Correlation (PPC) techniques and includes both methods and apparatus. A PPC technique according to an embodiment of the invention uses adaptive frequency domain filtering to aid in the generation of candidate motion vectors when a PPC is used to determine image correlation.

According to one aspect of the invention, it is first determined whether or not it would be beneficial to pre-filter an input image prior to applying a conventional PPC process. If pre-filtering is determined to be desirable, it is carried out. If, on the other hand, pre-filtering is determined not to be needed, it is not carried out and the normal PPC process proceeds without any pre-filtering. The use of selective pre-filtering results in the creation of more reliable and consistent PPC surfaces than otherwise would be obtained without such pre-filtering.

The decision regarding pre-filtering and the pre-filtering are carried out using an adaptive frequency domain filter. Pre-filtering is carried out in the frequency domain where time-domain convolution is effectively carried out efficiently using components that carry out multiplication with an in-place window. Energy of image high-frequency content is measured in computed Fourier surfaces to gauge the degree of high frequency content in the image. The amount of high frequency content is then used to control or "adapt" the filtering process.

The conventional phase plane approach uses a fully normalized numerator. This is not always necessary depending on the application. In contrast, according to the invention described herein, normalizing the denominator used to "whiten" the frequency spectrum can be modulated to potentially deal with frequency band specific content more appropriately. In terms of the high-frequency estimator 316 one can choose to whiten to a lesser or greater degree based on the relative distribution of content in the frequency surface. For example, if the image content is largely high-frequencies, the exponent can be made to be larger than it would otherwise be. In contrast, if the image content is more narrow banded in nature (less high frequency components), one could choose a normalizing exponent that is smaller than it would otherwise be.

In practical applications a profile or schedule of normalizing exponent can be developed based on the nature and purpose of an underlying application. The devising and selection of one or more profiles makes it possible to gauge the precision of, and the extent of, differentiation of candidate motion vectors.

The techniques described herein are useful in advanced video processing, particularly when phase plane correlation for frame rate conversion is utilized. Reducing the number of spurious motion vector candidates is a primary concern for implementation. Accordingly, applications for embodiments of the present invention include video frame correlation, video data compression and video processing systems.

A method according to an embodiment of the invention includes:
 i) computing the Fourier transform of first and second images;
 ii) estimating a high-frequency content directly from the Fourier surfaces;
 iii) computing a window function that is a function of the estimated high-frequency energy;
 iv) applying the window to the Fourier surfaces; and
 v) providing modified Fourier surfaces into a PPC process.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The present invention is described with reference to the accompanying drawings. In the drawings, like reference numbers indicate identical or functionally similar elements. The drawing in which an element first appears is indicated by the left-most digit in the corresponding reference number.

Figure 1:
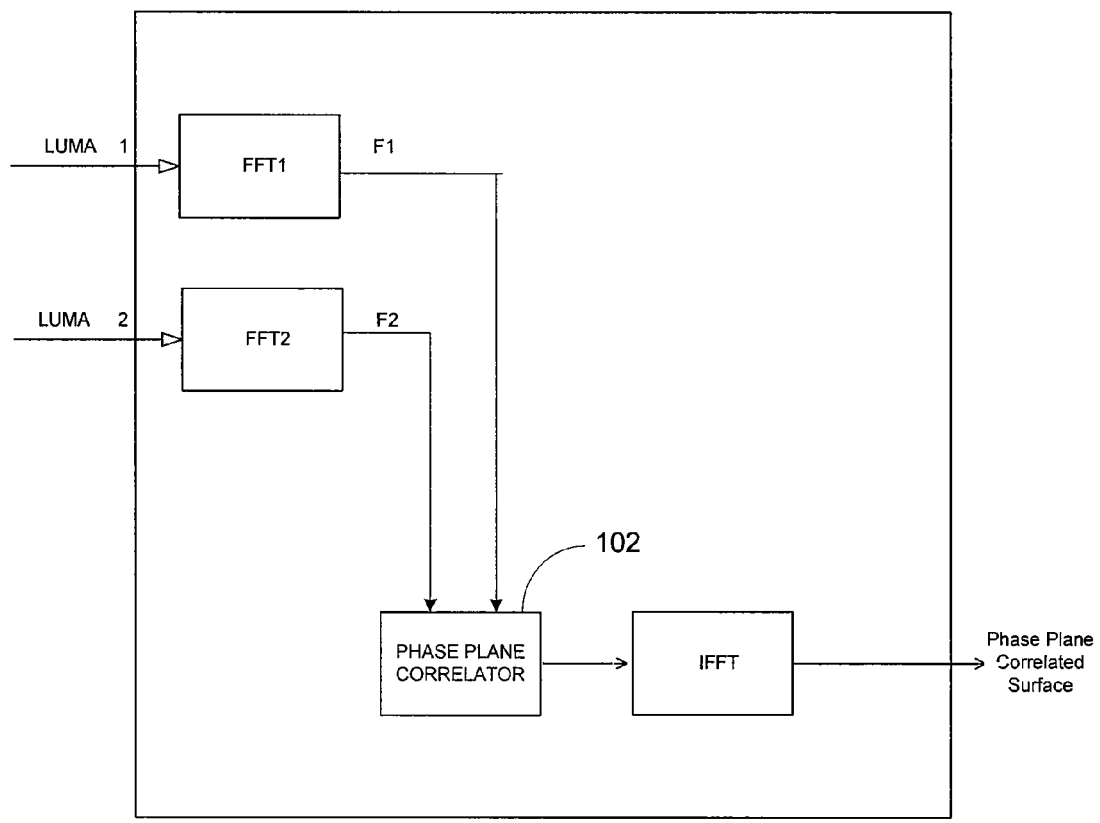
FIG. 1 (Prior Art) is a block diagram illustrating a portion of a known arrangement for PPC image correlation.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

The invention will be better understood from the following descriptions of various embodiments of the invention. Thus, specific embodiments are views of the invention, but each does not itself represent the whole invention. In many cases individual elements from one particular embodiment may be substituted for different elements in another embodiment carrying out a similar or corresponding function. Those skilled in the art with access to the teachings provided herein will recognize additional modifications, applications, and embodiments within the scope thereof and additional fields in which the invention would be of significant utility.

The invention provides a Phase Plane Correlation (PPC) technique that uses adaptive frequency domain filtering to aid in the generation of candidate motion vectors when the Phase Plane Correlation approach is used. It is determined whether or not it would be beneficial to pre-filter an input image prior to applying the PPC process. If so, pre-filtering is carried out using an adaptive frequency domain filter. This results in more reliable and consistent PPC surfaces than otherwise.

Figure 2:
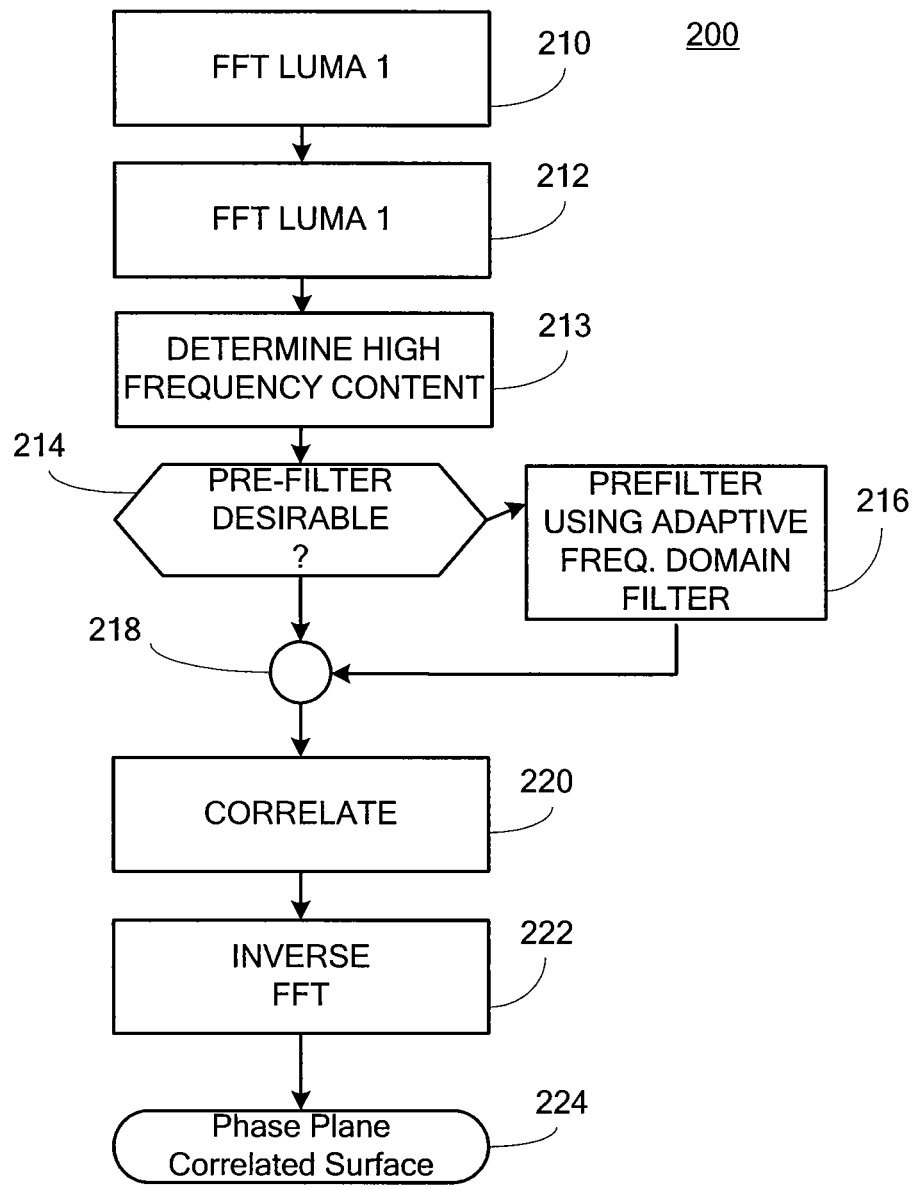
FIG. 2 is a flow chart of a method according to an embodiment of the invention.

FIG. 2 is a flow chart of a method 200 of phase plane correlating according to an embodiment of the invention. It explains a general principle of the invention, namely optionally pre-filtering phase plane images to improve the correlation and accuracy of a phase plane correlated surface. A first image, represented by LUMA 1 in the time domain is transformed at step 210 into the frequency domain to form a frequency domain signal F1. This step can be carried out by a Fast Fourier Transform. A second image, represented by LUMA 2 in the time domain is transformed at step 212 into the frequency domain to form a frequency domain signal F2. This step can also be carried out by a Fast Fourier Transform. An amount of high frequency energy in an image such as phase plane images F1 and F2 is determined at step 213. At 214 it is determined whether or not pre-filtering is desirable based on the energy of high frequency components determined at 213. If pre-filtering is determined to be desirable, it is carried out at 216 using an adaptive filtering process. Adaptive filtering is carried out by generating and using an adaptive window that is generated based on an amount of high frequency content present in phase plane images F1 and F2. The amount of high frequency content present in phase plane images F1 and F2 is used to determine the shape of a window function used for pre-filtering. Note that in various embodiments of the present invention the adaptive window can be based on the high frequency content present in only phase plane image F1, on the high frequency content present in only phase plane image F2, or based on the high frequency content present in both phase plane images F1 and F2. An adaptive window function can be controlled so that it is possible to choose to whiten to a lesser or greater degree based on a relative distribution of content in the frequency surfaces. High frequency content is preferably measured in an edge portion of phase plane images F1 and F2. For example, if the image content is such that it comprises mainly high-frequencies, the exponent can be made to be larger than it otherwise would be. In contrast, if the image content is more narrow banded in nature, the normalizing exponent can be made to be smaller than it would otherwise be. In general, any profile or schedule of normalizing exponent could be devised depending on the exact nature and purpose that would make it possible to gauge the precision of, and the extent of differentiation, of candidate motion vectors.

Regardless of whether or not pre-filtering is carried out, correlation is carried out at 220. The correlation result of 220 is inverse Fourier transformed at 222 to provide a phase plane correlated surface in the time domain at 224.

Figure 3:
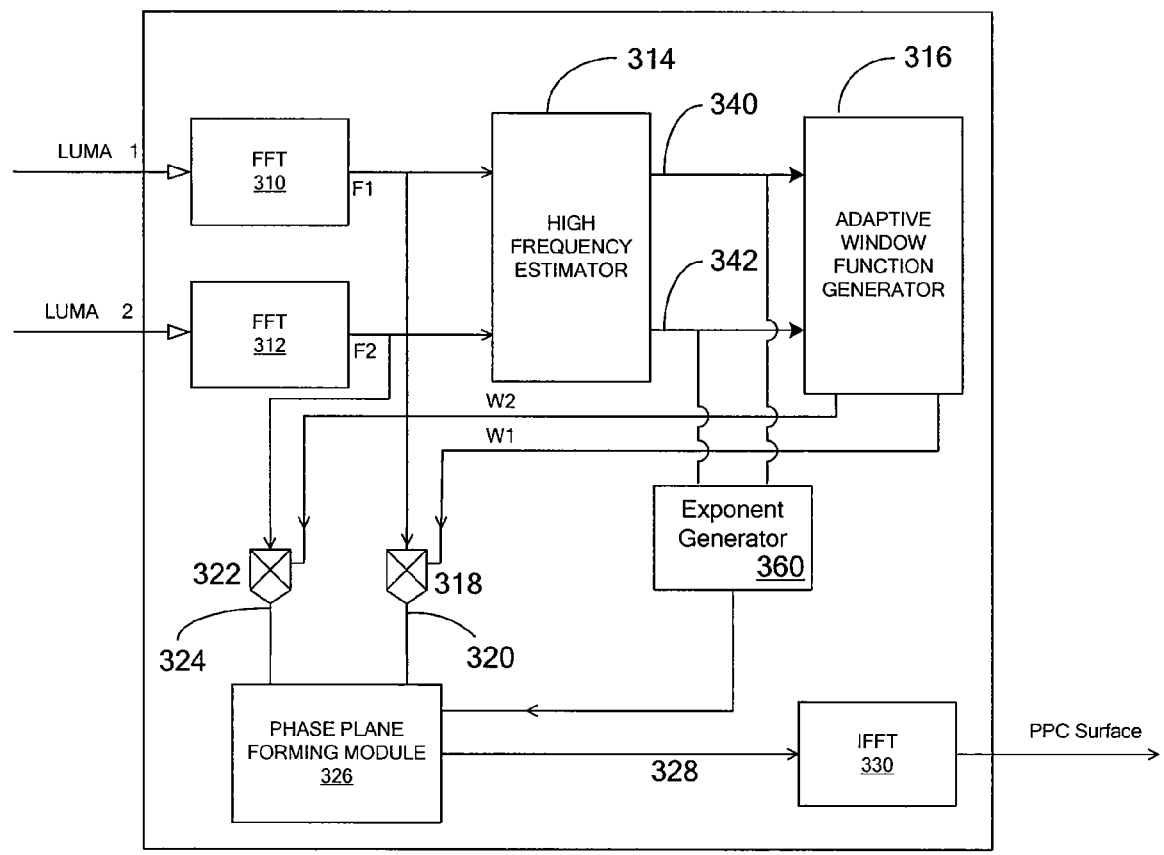
FIG. 3 is a block diagram of an arrangement for PPC image correlation including adaptive frequency domain filtering according to an embodiment of the invention.

FIG. 3 is a block diagram of an arrangement for PPC image correlation including adaptive frequency domain filtering according to an embodiment of the invention. A first image, represented by a signal LUMA 1 in the time domain is transformed to the frequency domain by a Fast Fourier Transform module 310 to provide a phase plane image F1. A second image, represented by a signal LUMA 2 in the time domain is transformed to the frequency domain by a Fast Fourier Transform module 312 to provide a phase plane image F2.

Phase plane images F1 and F2 are input to a high frequency estimator 314 which is configured to estimate a total energy of a FFT surface and a high frequency energy of that FFT surface. High frequency estimator 314 thus provides both a total energy and a high frequency energy content of FFT surfaces F1 and F2. The total energy estimate is provided at an output 340 and the high frequency estimate is provided at an output 342. The process carried out by high frequency estimator 314 is explained further with respect to FIG. 6, described below. The total energy estimate and high frequency energy estimate are provided to adaptive window function generator 316.

Adaptive window function generator 316 provides an adaptive window that is used to carry out adaptive filtering of phase plane images F1 and F2. This adaptive window is generated based on an amount of high frequency content present in phase plane images F1 and F2, as provided by high frequency estimator 314. In essence, the amount of high frequency content present in phase plane images F1 and F2 is used to determine the shape of a window function generated by adaptive window function generator 316. In essence adaptive window function generator 316 computes a window function based on total and high frequency energy values and then generates a window based on the computed window function.

Operation of high-frequency estimator 314 and adaptive window function generator 316 can be controlled so that it is possible to choose to whiten to a lesser or greater degree based on a relative distribution of content in the frequency surfaces. For example, if the image content is such that it comprises mainly high-frequencies, the exponent in the denominator term of Equation 2 (below) can be made to be larger than it otherwise would be. In contrast, if the image content is more narrow banded in nature, the normalizing exponent can be made to be smaller than it would otherwise be. In general, any profile or schedule of normalizing exponent can be used depending on the exact nature and purpose of gauging the precision of, and the extent of differentiation, of candidate motion vectors.

Window function generator 316 is configured to receive from high frequency estimator 314 estimates of total energy and high frequency energy in a FFT surface. These estimates are on lines 340 and 342, respectively, shown in FIG. 3. The total energy and high frequency energy are used to determine a weighting function that will be applied to a FFT surface. In addition, the exponent alpha is also determined from these two input values using a user-defined function in block 360. The user-defined function may be expressed by a closed-form analytic equation or it may be represented by a lookup table. Note that in various embodiments of the present invention the exponent alpha can be based on the high frequency content present in only phase plane image F1, on the high frequency content present in only phase plane image F2, or based on the high frequency content present in both phase plane images F1 and F2.

Figure 8:
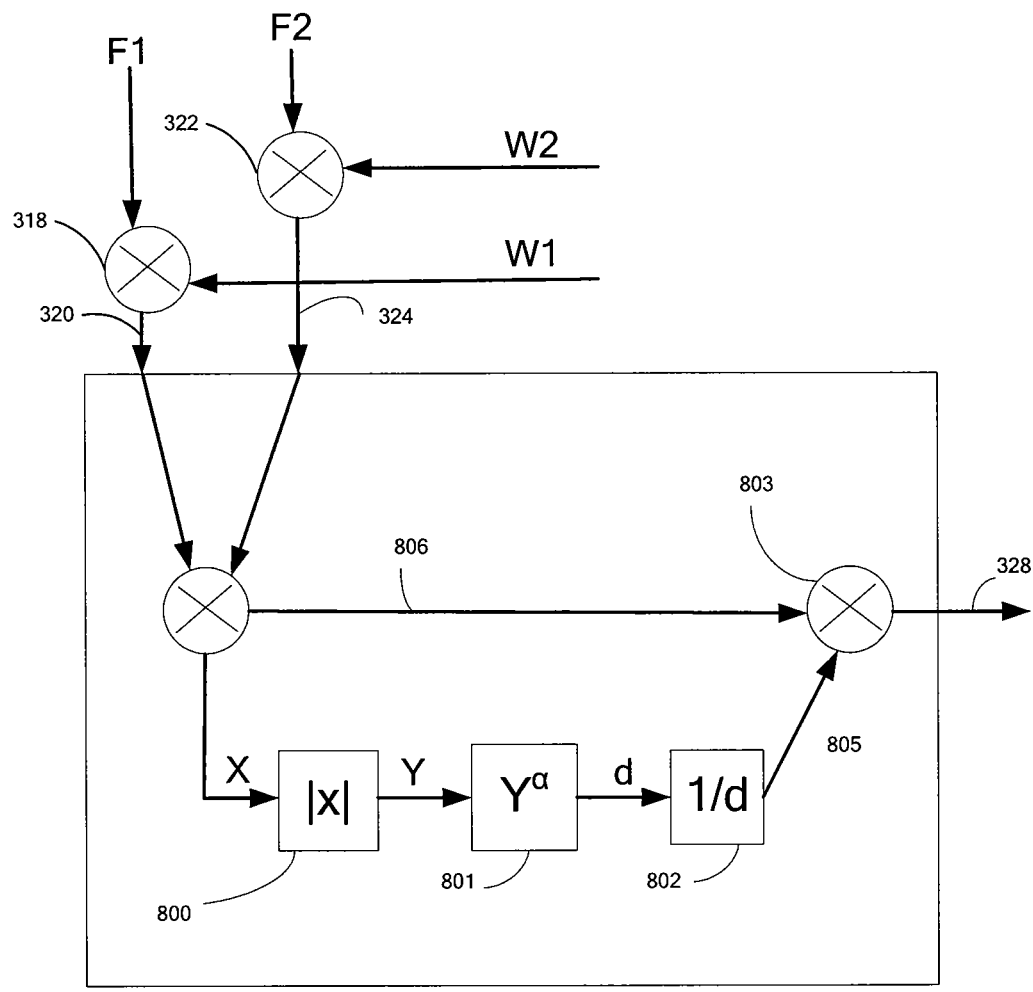
FIG. 8 is a block diagram of phase plane forming module 326 shown as a general block in FIG. 3.

As will be explained further with respect to FIG. 4, the high frequency content is preferably determined in an edge portion of phase plane images F1 and F2. The window function is represented by W1 and W2 at outputs of adaptive window function generator 316. Phase plane image F1 is windowed by the window function W1 by providing F1 and the window function at inputs of a mixer 318 which provides a first windowed surface at an output 320. Image F2 is windowed by the window function W2 by providing F2 and the window function at inputs of a mixer 322 to provide a second windowed surface at an output 324. Note that W1 and W2 can be different functions or the same function denoted by the symbol W. A phase plane forming module 326 processes the first and second windowed surfaces to form a phase plane based on the signals at an output 328 thereof. A more detailed diagram of phase plane forming module 326 is shown in FIG. 8. In essence, phase plane forming module 326 provides a frequency whitened spectrum. Operation of phase plane forming module 326 can be expressed by $$(W1 \cdot F1) \cdot (W2 \cdot F2)^* / |(W1 \cdot F1) \cdot (W2 \cdot F2)^*|.$$

Output 328 of phase plane forming module 326 is coupled to an input of an Inverse Fast Fourier Transform module 330 which provides an image surface that has been phase plane correlated. This surface can then be fed to a conventional phase plane correlation (PPC) processing system.

The adaptive window function provided by the adaptive window function generator 316 can be computed in various ways. An embodiment explaining how the window function may be computed is now set forth. According to this embodiment, the shape of the window function generated is based at least in part on the frequency content of the frequency domain surface as computed by the two-dimensional Fourier transforms at FFT 310 and FFT 312. According to an exemplary embodiment, one possible behavior for the window function would be to alter window shape based on the amount of high-frequency content present in the frequency domain surfaces. For example, it is possible to define a region of the frequency domain surface that corresponds to significant presence of high-frequency content and compute a ratio of this energy in that region to the total energy of the surface. That ratio is represented by a number in the range of "0" to "1". This ratio is used to control a drop off rate of the adaptive window in the high-frequency content. For example, one version of the equation that governs the shape of the adaptive window is shown as Equation 1. Equation 1 represents a two-dimensional Gaussian window function.

$$W(x, y) = \kappa \exp\left(-\frac{(x - x_0)^2}{2\sigma_x^2} - \frac{(y - y_0)^2}{2\sigma_y^2}\right) \quad \text{(Equation 1)}$$

where $\kappa$ is a normalization constant. The values of $\sigma_x$ and $\sigma_y$ are functions of the ratio. For instance, if these two parameters are tied to the ratio in a proportional manner, the ratio will be smaller and the flatter the windowing function will become. If they are inversely related, the ratio will be larger and the faster the window function will decay.

As an alternative, the ratio of high frequency energy to total energy can be used to control a normalization process used in the PPC process. Equation 2 represents fractionally normalized phase plane correlation.

$$PPC(I_1, I_2) = F^{-1}\left(\frac{F(I_1) \cdot F(I_2)*}{|F(I_1) \cdot F(I_2)*|^\alpha}\right). \quad \text{(Equation 2)}$$

Equation 2, above, includes an exponent on the denominator. The exponent on the denominator allows one to modulate the degree to which the spectrum in the frequency domain is "whitened." For example, when the exponent is unity, the result is a conventional PPC. When the exponent is zero, the result is a conventional cross-correlation. However, when the exponent is between zero and one, a fractional normalization takes place. The exponent can also be greater than one, although such an exponent value does not correspond to a readily understood intuitive understanding. The degree to which normalization occurs depends on whether there is present narrow band or wide band noise. In general, the exponent can be any arbitrary function of the frequency surface.

Figure 4:
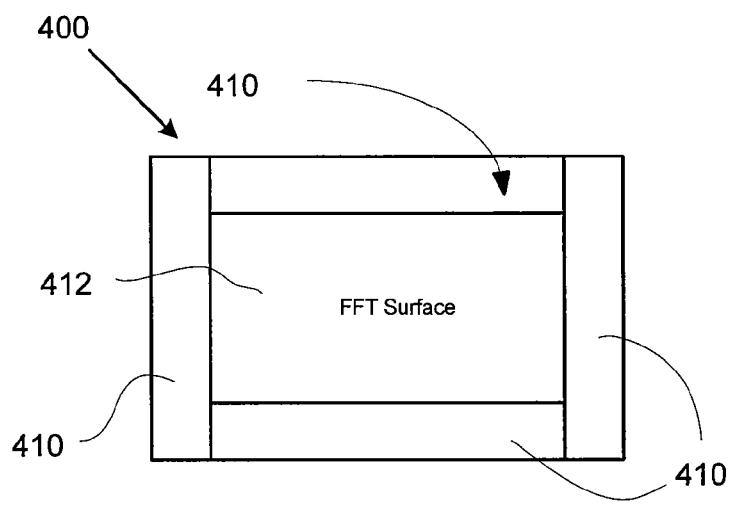
FIG. 4 is a graphical representation of an image in the frequency plane (either F1 or F2 in FIG. 2) illustrating the concept of high frequency estimation that occurs in high frequency estimator 314.

FIG. 4 is a graphical representation of a phase plane image 400, such as, for example phase plane image F1 or phase plane image F2. This figure helps to explain the concept of high frequency estimation that is carried out by high frequency estimator 314. Edge regions 410 of phase plane surface 400 represent high frequency regions of a Fast Fourier Transform (FFT) surface. A motion vector would, for example be somewhere in a central region 412 of phase plane surface 400. In essence, the graphical representation is that of a matrix of frequency domain points. The energy of each such point located in an edge region, such as 410, is calculated. Then, the energies of such points are summed to determine a total energy present in "high frequency" components of the FFT surface. A signal representing this total energy is what is coupled from high frequency estimator 314 to an input of adaptive window function generator 316 in FIG. 3.

Figure 5:
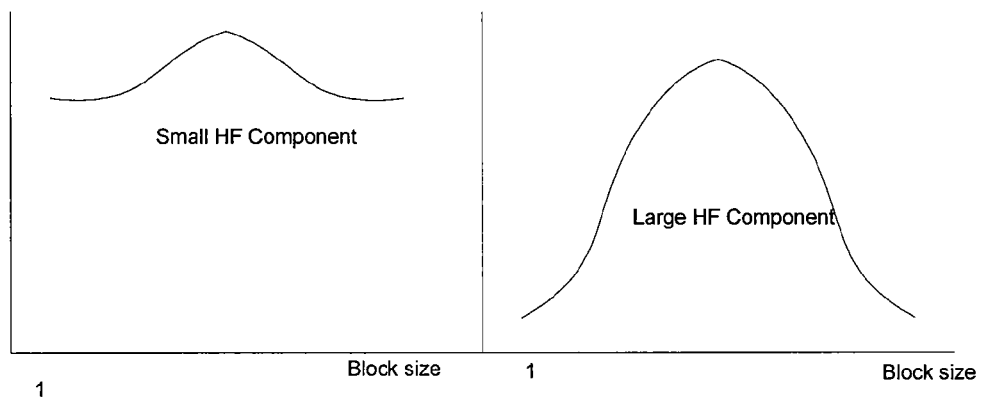
FIG. 5 is a graphical representation of a result of high frequency estimation carried out by high frequency estimator 314.

FIG. 5 is a graphical representation of a result of high frequency estimation carried out by high frequency estimator 314. The curves represent examples of the shape of a window function generated by adaptive window function generator 316. The left portion of the FIG. 5 representation illustrates an exemplary window function for a case in which there is a low amount of energy in high frequency components of an image such as phase plane image F1 or phase plane image F2. The right portion of the FIG. 5 representation illustrates an exemplary window function for a case in which there is a higher amount of energy in high frequency components of a phase plane image such as phase plane image F1 or phase plane image F2.

Figure 6:
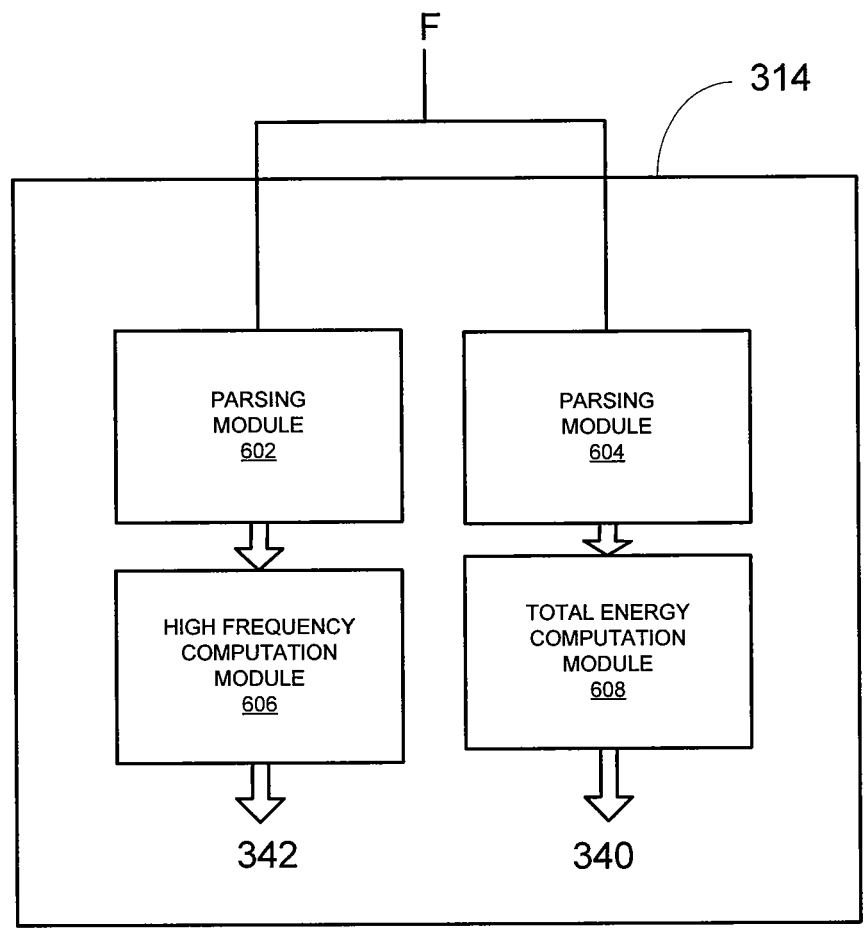
FIG. 6 is a block diagram of high frequency estimator 314 shown as a general block in FIG. 3.

FIG. 6 is a block diagram further explaining operation of high frequency estimator 314 shown as a general block in FIG. 3. A frequency surface F, such as F1 produced by FFT 310 or F2 produced by FFT 312 is parsed by a parsing module 602 and a parsing module 604. A high frequency computation module 606 computes an estimate of high-frequency energy using a user-defined mask, or weighting function. This high frequency energy estimate is provided at output 342 of high frequency estimator 314. A total energy computation module 608 computes an estimate of total energy using a user-defined mask, or weighting function. This total energy estimate is provided at output 340 of high frequency estimator 314.

Different masking or weighting functions can be used to optimize results for particular applications. The function can, for example, be a simple weighting with real-valued numbers corresponding to elements in the FFT surface. The energy calculation can be, for example, the magnitude of a complex phasor at each entry of the FFT array. Parsing and computation may be performed serially or concurrently. These functions can be carried out by software running on a processor or by a hard-wired circuit.

Figure 7:
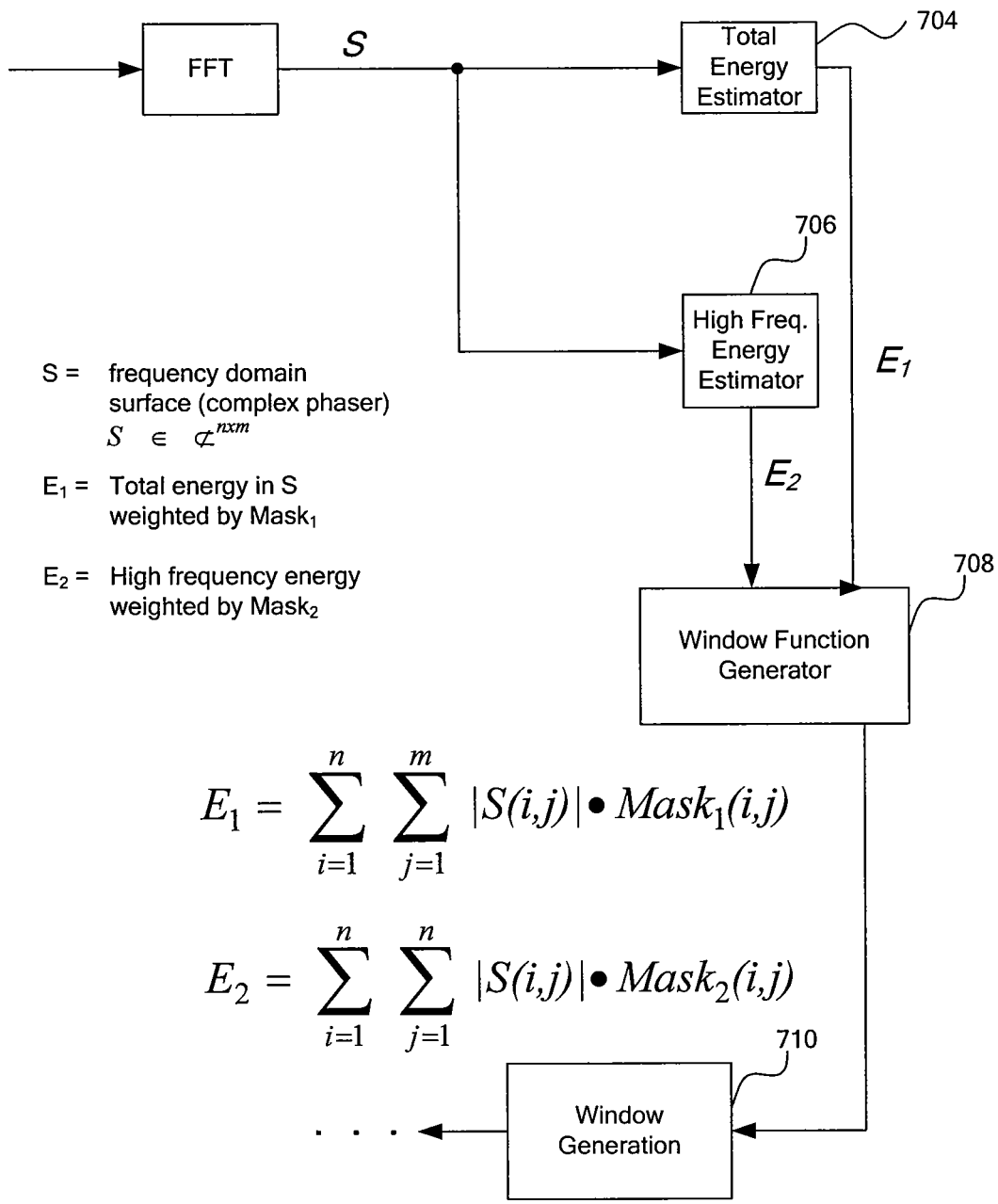
FIG. 7 is a block diagram of an embodiment of high frequency estimator 314 and adaptive window function generator 316.

FIG. 7 is a block diagram of an embodiment of high frequency estimator 314 and adaptive window function generator 316. An FFT surface is generated by a FFT, such as, for example FFT 310 shown in FIG. 3. This surface is represented by "S" in FIG. 7. S is a frequency domain surface that can be represented by a complex phasor S as shown in the figure. Surface S is input to high frequency estimator 314 which, in this embodiment, comprises total energy estimator 704 and high frequency estimator 706. Total energy estimator 704 provides an estimate E1 of total energy of surface S. High frequency estimator 706 provides an estimate E2 of high frequency energy of surface S, such as, for example, in region 410 shown in FIG. 4. E1 represents the measure of activity in the signal at each frequency. Each element on the surface represents a combination of vertical and horizontal frequency components (by definition) of the Fourier transform. In computing E1, one obtains a snapshot of what waveforms and how much of them are needed to represent the original signal. E2 represents the measure of activity in the signal at frequencies above a certain predetermined frequency. Adaptive window function generator 316 includes a window function generator 708 and a window generator 710. A window function is computed by window function generator 708 based on energy E1 and energy E2. The function generated by window function generator 708 is used by window generator 710 to generate an actual window (to be input to mixer 318 or 322 shown in FIG. 3).

The processing performed by the blocks shown in FIG. 3 computes and forms the term, $$\frac{(W_1 \cdot F(I_1)) \cdot (W_2 \cdot F(I_2))*}{|(W_1 \cdot F(I_1)) \cdot (W_2 \cdot F(I_2))*|^\alpha} \quad \text{(Equation 3)}$$

Equation 3 represents weighted phase plane correlation with fractional normalization. The exponent is computed by examining the ratio produced in FIG. 6 outputs 342 versus 340, or by means of a look-up table—as described previously. This forms the exponent term as shown in the equation above.

FIG. 8 is a diagram further explaining operation of phase plane forming module 326 shown as a general block in FIG. 3. Phase plane forming module 326 receives inputs 320 and 324 and provides an output 328. The internal components of phase plane forming module 326 comprised of the inputs 320 and 324 and output 328 consists of a Euclidean norm operation on the complex vector 800, the exponentiator 801 and inverter 802 which collectively carry out the functions represented by the denominator of Equation 3, above, representing weighted phase plane correlation with fractional normalization. The output 805 of inverter 802 is multiplied by a multiplier 803 with a signal 806 from a multiplier 820 receiving inputs 320 and 324. The output of multiplier 803 forms the fractionally normalized phase plane output 328.

It should be noted that the simulation, synthesis and/or manufacture of the various embodiments of this invention may be accomplished, in part, through the use of computer readable code, including general programming languages (such as C or C++), hardware description languages (HDL) including Verilog HDL, VHDL, Altera HDL (AHDL) and so on, or other available programming and/or schematic capture tools (such as circuit capture tools). This computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

CONCLUSION

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments reveals the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The breadth and scope of the present invention should not be limited by any of the above-described exemplary embodiments, but should be defined only in accordance with the following claims and their equivalents.

What is claimed is:

1. A method for producing a phase plane correlated surface comprising:
    Fourier transforming by a digital device first and second time domain images to create a first and second phase plane images, respectively;
    prefiltering the first and second phase plane images, said prefiltering based on certain predetermined criteria;
    correlating by the digital device the first and second phase plane images to form a frequency domain correlated phase plane surface; and inverse Fourier transforming the frequency domain correlated phase plane surface to provide a phase plane correlated surface.

2. The method according to claim 1 wherein the prefiltering leaves the first and second phase plane images unchanged.

3. The method according to claim 1 wherein the predetermined criteria relates to a frequency content of the first and second phase plane images.

4. The method according to claim 3 wherein the predetermined criteria relates to a frequency content of the first and second phase plane images in edge portions of those images.

5. The method according to claim 1 wherein the correlating includes fractional normalization.

6. The method according to claim 5 wherein the correlating that includes fractional normalization uses an exponent with a value in the range zero to one.

7. The method according to claim 5 wherein the correlating that includes fractional normalization uses an exponent value that is generated by a closed-form analytic equation or a look-up table.

* * * * *